(12) United States Patent
Oh

(10) Patent No.: US 10,505,445 B2
(45) Date of Patent: Dec. 10, 2019

(54) POWER CONVERTER WITH OUTPUT VOLTAGE CONTROL

(71) Applicant: Apple Inc., Cupertino, CA (US)

(72) Inventor: InHwan Oh, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 343 days.

(21) Appl. No.: 15/387,329

(22) Filed: Dec. 21, 2016

(65) Prior Publication Data

US 2018/0041073 A1     Feb. 8, 2018

Related U.S. Application Data

(60) Provisional application No. 62/372,104, filed on Aug. 8, 2016.

(51) Int. Cl.
| | | |
|---|---|---|
| *H02M 3/158* | (2006.01) | |
| *H02M 3/156* | (2006.01) | |
| *H02M 1/00* | (2006.01) | |

(52) U.S. Cl.
CPC .... *H02M 3/156* (2013.01); *H02M 2001/0025* (2013.01)

(58) Field of Classification Search
CPC ...................... H02M 3/156; H02M 2001/0025
See application file for complete search history.

(56) References Cited

U.S. PATENT DOCUMENTS

| | | | |
|---|---|---|---|
| 4,628,284 A | 12/1986 | Bruning | |
| 4,816,982 A * | 3/1989 | Severinsky | H02M 1/4225 323/285 |
| 4,866,367 A | 9/1989 | Ridley | |
| 6,728,117 B2 | 4/2004 | Schemmann et al. | |
| 7,342,362 B2 | 3/2008 | Lin | |

(Continued)

FOREIGN PATENT DOCUMENTS

WO    WO 13/182844    12/2013

OTHER PUBLICATIONS

Choi et al., "A Novel Bridgeless Single-Stage Half-Bridge AC/DC Converter," Virginia Polytechnic Institute and State University, Future Energy Electronics Center, Blacksburg, Virginia, 2010, 5 pages.

(Continued)

*Primary Examiner* — Jared Fureman
*Assistant Examiner* — Michael J Warmflash
(74) *Attorney, Agent, or Firm* — Brownstein Hyatt Farber Schreck, LLP

(57) ABSTRACT

A variable-output power converter includes a switch-mode voltage conversion stage operating in a peak-current control mode. For example, the timing of the turn-off of a MOSFET associated with a buck converter can be adjusted based on a measurement of current conducted through the by MOSFET. When the current through the MOSFET exceeds a threshold, the MOSFET is turned off, thereby defining the peak current that can be output by the variable-output power converter. The peak-current threshold can be adjusted by changing one or more characteristics of a compensation network configured to provide positive feedback to the variable-output power converter. In many examples, the peak-current threshold is adjusted using a pulse-width modulated signal.

16 Claims, 9 Drawing Sheets

(56) References Cited

U.S. PATENT DOCUMENTS

| | | |
|---|---|---|
| 7,426,120 B2 | 9/2008 | Yang |
| 7,479,773 B2 | 1/2009 | Michishita |
| 7,492,135 B2 | 2/2009 | Saeki |
| 7,675,275 B2 | 3/2010 | Ruobiao et al. |
| 7,911,813 B2 | 3/2011 | Yang et al. |
| 7,982,548 B2 | 7/2011 | Athas |
| 8,077,487 B2 | 12/2011 | Huynh |
| 8,125,799 B2 | 2/2012 | Zhu et al. |
| 8,587,964 B2 | 11/2013 | Yang |
| 8,699,299 B2 | 4/2014 | Horsky et al. |
| 8,803,563 B2 | 8/2014 | Deng et al. |
| 8,842,450 B2 | 9/2014 | Jungreis |
| 8,917,068 B2 | 12/2014 | Chen et al. |
| 9,019,729 B2 | 4/2015 | Kleinpenning |
| 9,030,131 B2 | 5/2015 | Kado et al. |
| 9,048,739 B2 | 6/2015 | Shoji et al. |
| 9,124,184 B2 | 9/2015 | Sato et al. |
| 9,154,038 B2 | 10/2015 | Fang et al. |
| 9,166,481 B1 | 10/2015 | Vinciarelli et al. |
| 9,214,850 B2 | 12/2015 | Deng et al. |
| 9,231,411 B2 | 1/2016 | Baarman et al. |
| 9,252,676 B2 | 2/2016 | Yang et al. |
| 9,389,617 B2 | 7/2016 | Dally |
| 9,402,287 B2 | 7/2016 | Sasaki |
| 9,444,357 B1 | 9/2016 | Matthews |
| 9,461,558 B2* | 10/2016 | Bianco ............... H02M 1/4225 |
| 9,479,063 B2 | 10/2016 | Pan |
| 9,484,803 B2 | 11/2016 | Turchi |
| 9,490,716 B2 | 11/2016 | Tseng et al. |
| 9,621,053 B1 | 4/2017 | Telefus |
| 9,722,497 B2 | 8/2017 | Fang |
| 9,871,451 B2 | 1/2018 | Lin et al. |
| 9,876,365 B2 | 1/2018 | Mazaki et al. |
| 10,103,578 B2 | 10/2018 | Yu et al. |
| 10,116,279 B2 | 10/2018 | Ritter et al. |
| 2008/0043502 A1* | 2/2008 | Billig ............... H02M 3/156 363/71 |
| 2011/0109363 A1* | 5/2011 | Chen ............... H02M 3/156 327/178 |
| 2011/0260681 A1* | 10/2011 | Guccione ............... H02J 7/0054 320/108 |
| 2014/0042821 A1 | 2/2014 | Boys et al. |
| 2015/0214839 A1* | 7/2015 | Shiu ............... H02M 3/156 323/271 |
| 2016/0072393 A1 | 3/2016 | McIntyre |
| 2016/0099660 A1 | 4/2016 | Khaligh |
| 2016/0118894 A1 | 4/2016 | Zhang et al. |
| 2016/0268899 A1 | 9/2016 | Rader et al. |
| 2018/0004240 A1 | 1/2018 | Gritti et al. |
| 2018/0041116 A1 | 2/2018 | Oh |
| 2018/0083490 A1 | 3/2018 | Oh et al. |
| 2018/0091054 A1 | 3/2018 | Oh et al. |

OTHER PUBLICATIONS

U.S. Appl. No. 15/386,340, filed Dec. 21, 2016, Oh.
U.S. Appl. No. 15/476,652, filed Mar. 31, 2017, Oh et al.
U.S. Appl. No. 15/646,035, filed Jul. 10, 2017, Oh et al.
U.S. Appl. No. 15/711,182, filed Sep. 21, 2017, Oh et al.

* cited by examiner

POWER CONVERTER WITH OUTPUT VOLTAGE CONTROL

CROSS-REFERENCE TO RELATED APPLICATION

This application is a non-provisional patent application of, and claims the benefit to, U.S. Provisional Patent Application No. 62/372,104, filed Aug. 8, 2016, and titled "Power Converter With Output Voltage Control," the disclosure of which is hereby incorporated herein by reference in its entirety.

FIELD

Embodiments described herein generally relate to power converters and, in particular, to systems and methods for modifying output voltage of a variable-output power converter.

BACKGROUND

An electronic device can receive power from a power source, such as mains voltage. The electronic device can include a power converter to reduce the voltage of the power source to a level that is usable by the electronic device.

However, many conventional power sources are poorly regulated and provide noisy or otherwise highly-variable voltage. A conventional power converter may not be able to quickly react to changes in power output from a poorly-regulated power source. As a result, conventional power converters are typically implemented as a series of power regulation and/or buffer stages in order to mitigate the risk of damaging an electronic device by coupling that device to a poorly-regulated source. Conventional power regulation stages typically include one or more output capacitors and/or one or more voltage transformers. As a result, it may be difficult to accommodate a conventional power converter into a low-profile enclosure.

SUMMARY

Embodiments described herein generally reference a variable-output power converter that includes a high-side buck converter that can be accommodated in a low-profile enclosure. The buck converter can include a voltage-controlled switch, such as a MOSFET. A reference resistor can be connected in series to the source of the voltage-controlled switch such that a voltage across the reference resistor corresponds to current through the voltage controlled switch.

The variable-output power converter is also associated with a compensation network that may provide feedback to the converter and, additionally, may smooth, stabilize, or otherwise filter voltage output from the variable-output power converter. The compensation network can include a sense resistor and a toggle coupled in series. The sense resistor can be used to detect changes in the voltage output from the compensation network; the toggle can be used to selectively connect or disconnect the sense resistor from the compensation network, thereby changing one or more operational properties of the feedback provided by the compensation network and adjusting the voltage and/or peak current output from the variable-output power converter.

Further embodiments described herein generally reference power converter accommodated within a housing of an electronic device. The power converter includes a voltage reducer (e.g., buck converter) configured to reduce an input voltage relative to a first ground reference. The voltage reducer is coupled to a reference resistor. The power converter also includes a comparator having an input corresponding to a voltage measured across the reference resistor relative to a second ground reference. The first ground reference is isolated from the second ground reference. The power converter also includes a flip-flip with a reset lead configured to receive a first output voltage from the comparator. The power converter also typically includes a gate controller coupled to a gate of a MOSFET associated with the voltage reducer; the gate controller is configured to receive a second output voltage from the flip-flop. In operation, when current through the MOSFET increases beyond a threshold, the comparator causes the flip-flop to reset its output to zero.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
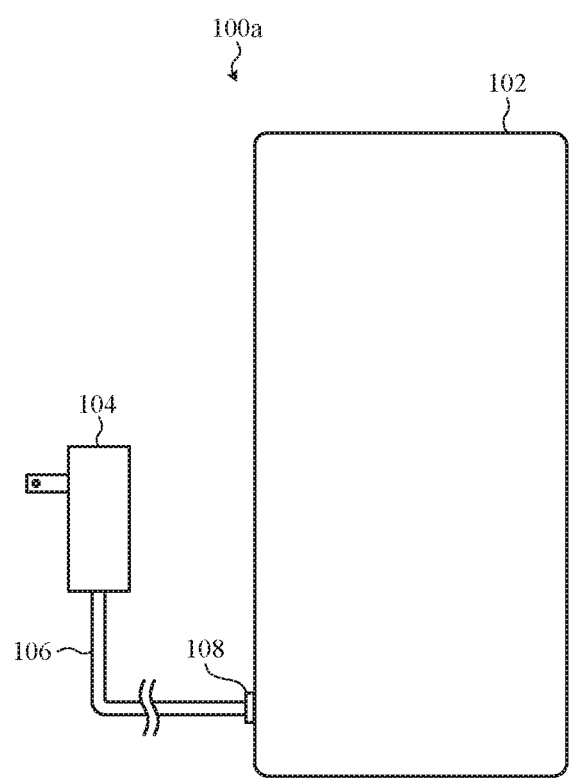
FIG. 1A depicts an electronic device coupled to a variable-output power converter.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for operating a variable-output power converter in a manner that efficiently converts poorly-regulated voltage received from an electric power source (more generally, a "power source") to a regulated level usable by one or more components of an electronic device. The electronic device may be any stationary or mobile electronic device, such as a desktop computer, a laptop computer, a tablet computer, a cellular telephone, a peripheral device, an accessory device, a wearable device (e.g., wrist-worn device, glasses device, worn display, and so on), a vehicle or aeronautical control or entertainment system, an industrial control system, an appliance, and so on.

A variable-output power converter, such as described herein, is configured to convert voltage from an unregulated or otherwise noisy voltage source (herein, "input voltage") into a regulated and/or stabilized voltage level (herein, "output voltage") suitable for use by one or more electronic devices. For example, a variable-output power converter can be configured to regulate mains voltage (e.g., 95 VAC-265 VAC at 50-60 Hz) to a reference level such as 3.3VDC, 5.0VDC, 12VDC, 20VDC and so forth.

For simplicity and consistency of the description provided herein, many embodiments are presented and described with reference to variable-output power converters configured to reduce a high voltage alternating current (e.g., 300VAC) to a relatively lower voltage direct current (e.g., 50VDC). It may be appreciated, however, that the various techniques, circuit topologies, operations and/or methods presented with respect to this particular implementation can be equivalently applied to variable-output power converters configured to regulate power in another manner. For example, a variable-output power converter described herein can be suitably configured to convert an arbitrary input voltage to any selected or desired output voltage, whether such operation requires DC-to-DC conversion stages, AC-to-DC conversion stages, DC-to-AC conversion stages, AC-to-AC conversion stages, or any combination or sequence thereof.

As noted above, many embodiments described herein reference a variable-output power converter configured to reduce a poorly-regulated (or unregulated) input voltage to a particular output voltage that is stabilized. In these examples, the variable-output power converter includes at least one voltage converter (such as a buck converter, boost converter, or boost-buck converter) operated at a duty cycle selected to efficiently change the input voltage to the output voltage level. In many cases, the output of the voltage converter is connected to a regulator, such as a feedback/compensation network. The output of the regulator can thereafter be connected to a load, such as an electronic device.

For simplicity and consistency of the description provided herein, many embodiments are presented and described with reference to variable-output power converters including buck converters (herein, generally, "voltage reducers"). It may be appreciated, however, that the various techniques, circuit topologies, operations and/or methods presented with respect to this particular implementation can be equivalently applied to other voltage converters such as, but not limited to, boost converters and boost-buck converters.

As noted above, it may be difficult to accommodate a conventional power converter into a space-constrained enclosure given that conventional power converters typically include multiple power conversion stages to compensate for rapid changes in a poorly regulated input voltage.

Accordingly, many embodiments described herein reference a variable-output power converter that can be operated in a peak current control mode, while maintaining stable output voltage. In these embodiments, the output voltage can be set by a pulse-width modulated signal that is used to adjust a reference voltage that influences the operation of the output voltage control loop and the current control loop. These and other embodiments are discussed below with reference to FIGS. 1A-6. However, those skilled in the art will readily appreciate that the detailed description given herein with respect to these figures is for explanation only and should not be construed as limiting.

Figure 1B:
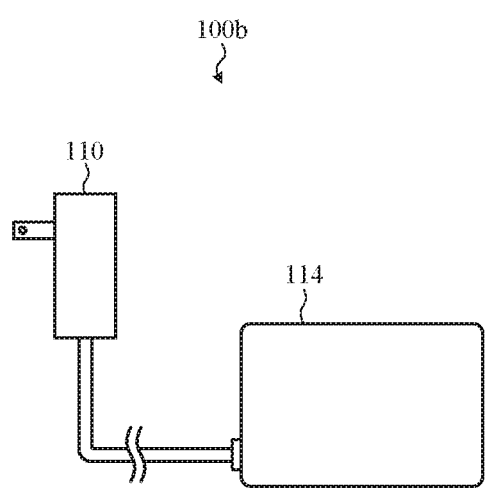
FIG. 1B depicts a stand-alone variable-output power converter configured to operate with a wireless power transfer system.
Figure 1C:
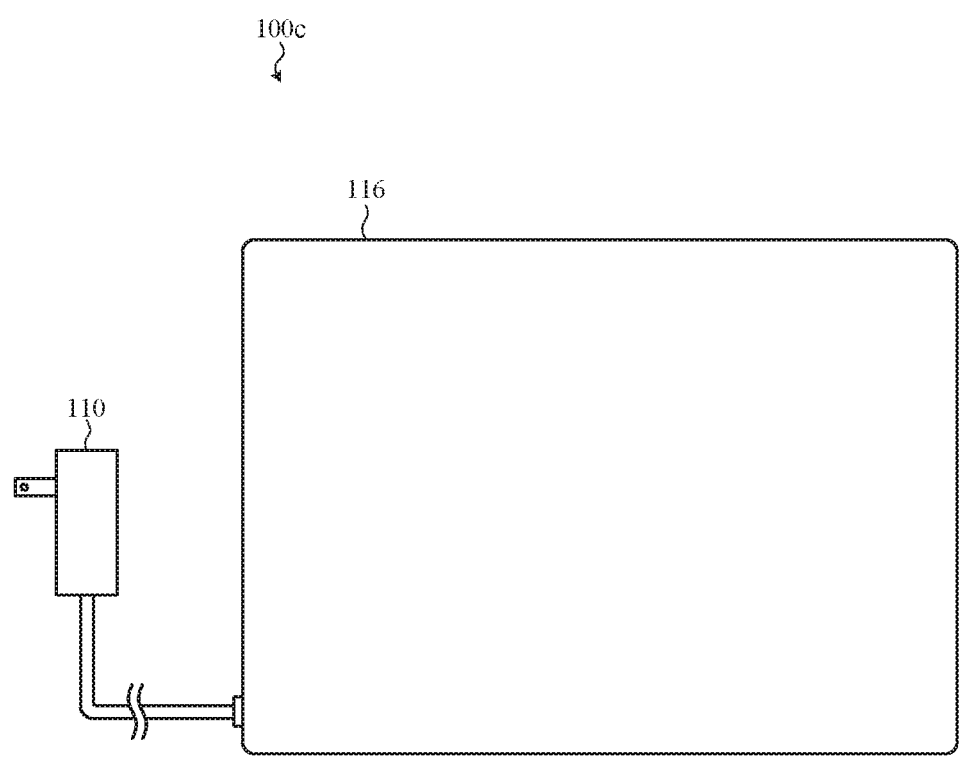
FIG. 1C depicts another stand-alone variable-output power converter configured to operate with a wireless power transfer system.

Generally and broadly, FIGS. 1A-1C reference various example electronic devices that may incorporate, or may be associated with or coupled to, one or more variable-output power converters such as described herein. It will be appreciated, however, that the depicted examples are not exhaustive; the various embodiments described with reference to FIGS. 1A-1C may be modified or combined in any number of suitable or implementation-specific ways.

For example, FIG. 1A depicts an electronic device coupled to a stand-alone variable-output power converter configured to change one or more characteristics of power received from a power source into a form usable by the electronic device.

More particularly, the electronic device 100a includes a housing 102 to retain, support, and/or enclose various components of the electronic device 100a such as a rechargeable battery (not shown). The electronic device 100a can also include a processor, memory, variable-output power converter and/or battery, network connections, sensors, input/output ports, acoustic elements, haptic elements, digital and/or analog circuits for performing and/or coordinating tasks of the electronic device 100a, and so on. For simplicity of illustration, the electronic device 100a is depicted in FIG. 1A without many of these elements, each of which may be included, partially and/or entirely, within the housing 102 and may be operationally or functionally associated with the internal battery.

In one example, the internal battery of the electronic device 100a can be recharged by physically connecting the electronic device 100a to a variable-output power converter 104. More specifically, a power cable 106 can provide a direct electrical connection between the variable-output power converter 104 and the electronic device 100a. In some cases, the power cable 106 is connected to the electronic device 100a via a connector 108.

In these embodiments, the variable-output power converter 104 can be configured to accept power at mains voltage and output that power in a form usable by one or more circuits configured to facilitate recharging of the internal battery. In one particular example, the variable-output power converter 104 accepts 120VAC as input and outputs 5VDC, which can be accepted by the electronic device 100*a* and used to recharge the internal battery. More broadly, the variable-output power converter 104 can be configured to accept high-voltage AC and can be configured to output low-voltage DC.

In another example, the variable-output power converter 104 can be configured to accept power at mains voltage and output that power in a form that is subsequently converted again by the electronic device 100*a* prior to being used to charge the internal battery. More specifically, in this example, the variable-output power converter 104 can be configured to accept 120VAC as input and can be configured to output up to 50VDC. Thereafter, the electronic device 100*a* can accept 50VDC and further convert, by a second variable-output power converter within the electronic device 100*a*, to 5VDC.

More broadly, the variable-output power converter 104 can be configured in this example to accept high-voltage AC and can be configured to output lower-voltage DC. In addition, the second variable-output power converter (which can be enclosed within the housing 102) can be configured to accept an intermediate DC voltage and can be configured to output a low-voltage DC.

It may be appreciated that the limited examples provided above are not exhaustive. For example, the variable-output power converter 104 may be configured to perform an AC-to-AC or AC-to-DC conversion to different voltages than those provided above. Similarly, a variable-output power converter enclosed within the housing of the electronic device 100*a* may be appropriately configured to provide AC-to-AC, AC-to-DC, DC-to-AC, or DC-to-DC conversion.

Furthermore, although illustrated as a cellular phone, it may be appreciated that the electronic device 100*a* can be another suitable electronic device that is either stationary or mobile, taking a larger or smaller form factor than illustrated. For example, in certain embodiments, the electronic device 100*a* can be a laptop computer, a tablet computer, a cellular phone, a wearable device, a health monitoring device, a home or building automation device, a home or building appliance, a craft or vehicle entertainment, control, power, and/or information system, a navigation device, and so on.

In still further embodiments, a variable-output power converter (such as the variable-output power converter 104) can be configured to operate with an inductive or resonant wireless power transfer system. For example, FIG. 1B depicts a stand-alone variable-output power converter, identified as the variable-output power converter 100*b*, configured to change one or more characteristics of power received from a power source into a form that may be wirelessly transferred to an electronic device (not shown). In this example, the variable-output power converter 100*b* can be configured to convert alternating current received via a connector end 110 into alternating current (at the same or different frequency) that can be used by a transmitter end 112 of the variable-output power converter 100*b* to generate one or more time-varying magnetic fields that can be used to wirelessly transfer power to an electronic device placed on or near the transmitter end 112. In this example, the variable-output power converter 100*b* can directly convert alternating current at one frequency and peak-to-peak voltage into altering current at a second frequency and peak to peak voltage. In this manner, the variable-output power converter 100*b* may operate more efficiently; an intermediate conversion to direct current is not required.

Another example of an inductive or resonant wireless power transfer system is depicted in FIG. 1C. More specifically, a variable-output power converter 100*c* can be configured to change one or more characteristics of power received from a power source into a form that may be wirelessly transferred to more than one electronic device is illustrated. As with the example described above, the variable-output power converter 100*c* can be configured to convert alternating current received via a connector end 110 into alternating current (at the same or different frequency) that can be used by a transmitter end 114 of the variable-output power converter 100*c* to generate one or more time-varying magnetic fields that can be used to wirelessly transfer power to multiple electronic devices each placed on or near the transmitter end 114. In this example, the variable-output power converter 100*c* directly converts alternating current at one frequency and peak-to-peak voltage into altering current at a second frequency and peak to peak voltage. In this manner, and as noted with respect to some embodiments described herein, the variable-output power converter 100*c* may operate more efficiently; an intermediate conversion to direct current is not required.

The embodiments represented by the depictions in FIGS. 1A-1C and the various alternatives thereof and variations thereto are presented, generally, for purposes of explanation, and to facilitate an understanding of various possible electronic devices or accessory devices that can incorporate, or be otherwise coupled to, one or more variable-output power converters such as described herein. More specifically, FIGS. 1A-1C are presented to illustrate that a variable-output power converter such as described herein can be incorporated, either entirely or partially, into the housing of an electronic device, into a separate power accessory that couples to an electronic device via a cable, into a separate power accessory that provides wireless power to one or more electronic devices, and so on.

Figure 2:
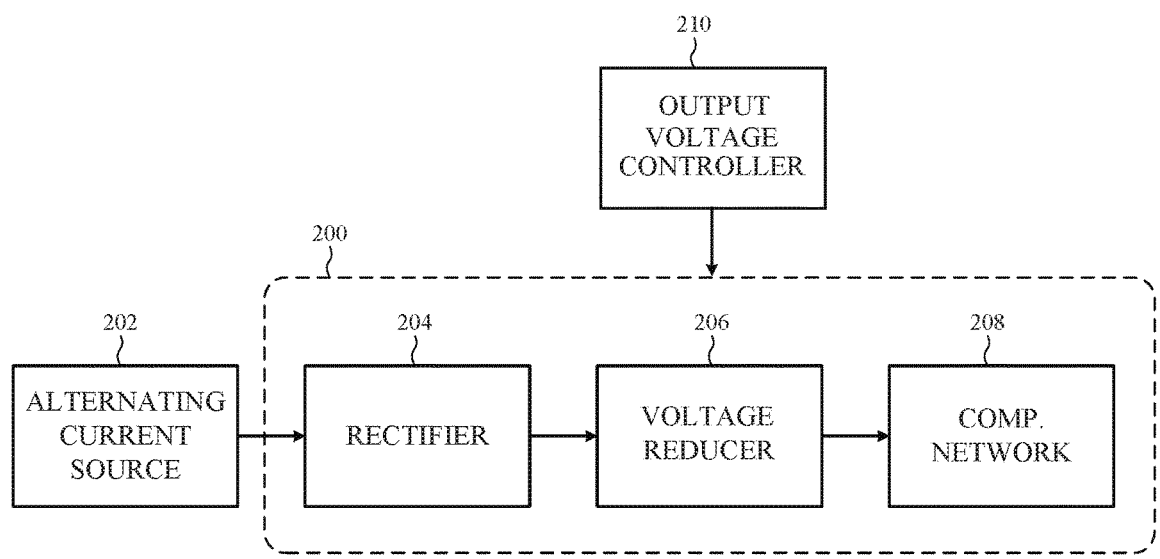
FIG. 2 is a simplified system diagram of a variable-output power converter that incorporates a voltage reducer, such as described herein.

Generally and broadly, FIG. 2 references a variable-output power converter that may be incorporated within, coupled to or otherwise associated with, an electronic device such as the electronic devices depicted in FIGS. 1A-1C.

For example, FIG. 2 depicts a simplified system diagram of a variable-output power converter that incorporates a voltage reducer such as described herein. The variable-output power converter 200 can be configured to accept power from an alternating current power source 202.

The alternating current power source 202 can deliver alternating current with any suitable amplitude or frequency. In one example, the alternating current power source 202 is connected to the output of a step-up converter (not shown) which can be configured to accept variable mains voltage as input (e.g., 90VAC-265VAC). In this case, the step-up converter may be configured to rectify and increase the received mains voltage to 300VDC, or any other suitable voltage level, whether alternating or direct, that is reliably higher than the maximum expected mains voltage level (e.g., 265VAC). In other cases, a step-up converter may not be required.

For simplicity of illustration and description, the embodiments that follow are described in reference to an alternating current power source 202 configured to output high voltage alternating current, such as 90VAC-265VAC, although as noted with respect to some embodiments described herein (e.g., wireless power transfer embodiments), any suitable alternating current power source can be stepped down or otherwise adjusted using the techniques, methods, and circuit topologies described below. For example, in some embodiments, an alternating current power source may not be required; the variable-output power converter 200 may receive an intermediate level of direct current voltage, such as 50VDC.

The variable-output power converter 200 can include multiple distinct and interconnected circuits or blocks, such as, but not limited to: a rectifier 204, a voltage reducer 206, and a feedback/compensation network 208. The variable-output power converter 200 can be coupled to an output voltage controller 210. In some cases, the variable-output power converter 200 can also include (or be associated with) one or more of a processor, memory, sensors, and digital and/or analog circuits for performing and/or coordinating tasks of the variable-output power converter 200. For simplicity of illustration and description, the variable-output power converter 200 is depicted in FIG. 2 without many of these elements.

The rectifier 204 of the variable-output power converter 200 receives alternating current from the alternating current power source 202 and rectifies the received current into a rippled direct current. The rectifier 204 can be a half-bridge rectifier, although in some embodiments a full-bridge rectifier is used. In many cases, a filter can be added in parallel to the output of the rectifier to further smooth the rippled direct current waveform. The filter can be any suitable low-pass filter (e.g., a capacitor or capacitor network parallel to the output of the rectifier, an inductor-capacitor choke, filter, and so on). The rectifier 204 can be implemented in any number of suitable ways. For example, the rectifier 204 can be a synchronous or asynchronous rectifier. For embodiments in which the alternating current power source 202 outputs ~300VAC, the rectifier 204 outputs rippled direct current having an average bias of 300VDC.

The voltage reducer 206 of the variable-output power converter 200 receives the rippled direct current from the rectifier 204. In some embodiments, the voltage reducer 206 is implemented with a buck converter topology (see, e.g., FIGS. 3A-3D) including a tank inductor, a catch diode, a switch (e.g., MOSFET), and an output capacitor. In many cases, the buck converter is operated in a discontinuous conduction mode, although this may not be required. More particularly, if the buck converter is operated in a discontinuous conduction mode, current through the tank inductor regularly reaches 0.0 A. In some embodiments, the buck converter can be operated at or near resonance. In other embodiments, the duty cycle of the buck converter may be adjusted from cycle to cycle based on feedback that varies with the output voltage.

The output of the voltage reducer 206 (e.g., buck converter) is rippled direct current having an average voltage bias defined and regulated by the duty cycle at which the voltage reducer 206 is operated, which may be fixed or variable. The feedback/compensation network 208 (or other voltage regulator) is positioned between the output of the voltage reducer 206 and the load in order to further smooth (and/or further regulate) the voltage applied to the load.

The voltage level output from the feedback/compensation network 208 can be adjusted and/or controlled by the output voltage controller 210. More specifically, in some embodiments, a control signal (e.g., a pulse width modulate signal) supplied by the output voltage controller 210 can be applied to the gate of a power MOSFET (not shown) that is coupled in series with a reference resistor associated with the feedback/compensation network 208. When the MOSFET is not conducting (e.g., the control signal is low), the reference resistor is disconnected from the feedback/compensation network 208, and voltage drop across the reference resistor is 0.0V (as a result of no current flow through the resistor). When the MOSFET is conducting, the reference resistor is connected to the feedback/compensation network 208 and a voltage drop across the resistor occurs. The function and operation of the feedback/compensation network 208 can change in response to the presence (or absence) of the resistor which, in turn, can change the feedback provided by the feedback/compensation network 208 to the comparator coupled to the voltage reducer 206, which in turn the voltage output from the variable-output power converter 200.

The foregoing embodiments depicted in FIG. 2 and the various alternatives thereof and variations thereto are presented, generally, for purposes of explanation, and to facilitate a thorough understanding of various possible configurations and circuit topologies of a variable-output power converter. However, it will be apparent to one skilled in the art that some of the specific details presented herein may not be required in order to practice a particular described embodiment, or an equivalent thereof.

Figure 3A:
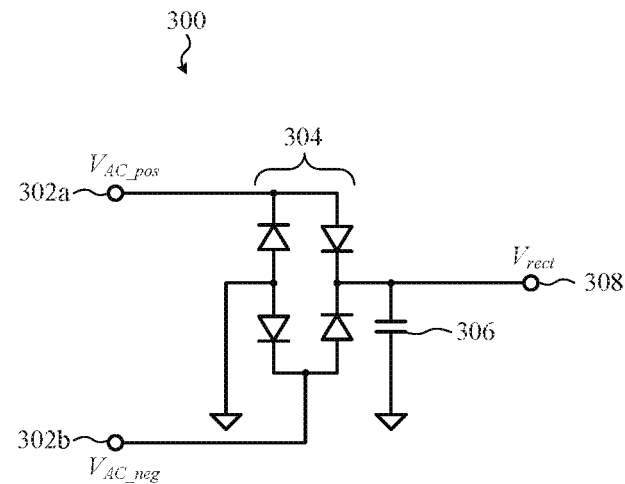
FIG. 3A is a simplified schematic diagram of a rectifier of a variable-output power converter, such as described herein.
Figure 3B:
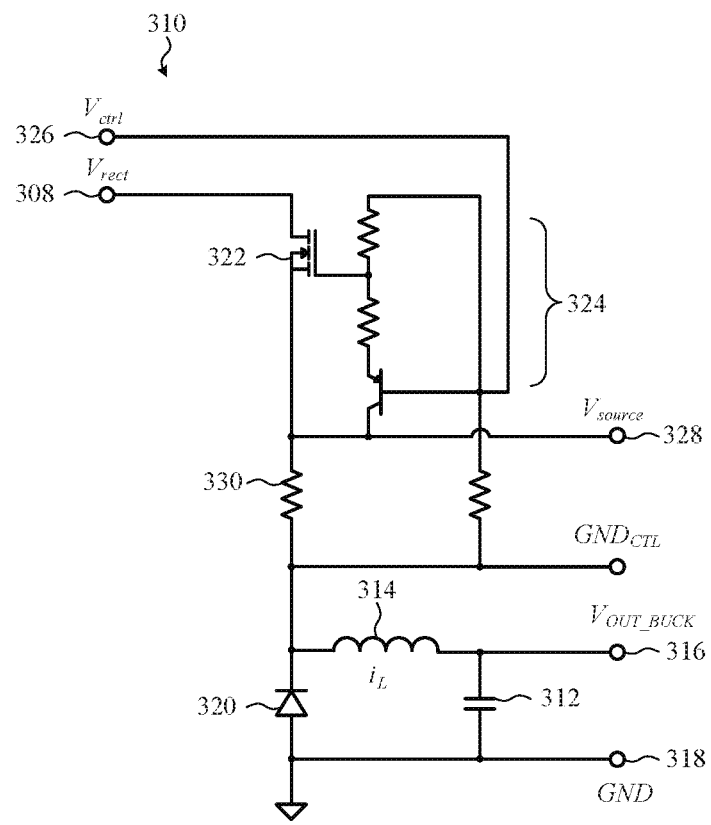
FIG. 3B is a simplified schematic diagram of a buck converter of the variable-output power converter described in reference to FIG. 3A.
Figure 3C:
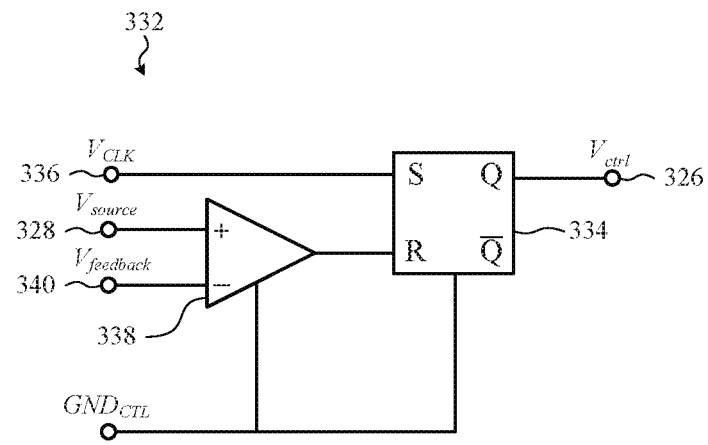
FIG. 3C is a simplified schematic diagram of a feedback controller of the variable-output power converter described in reference to FIGS. 3A-3B.
Figure 3D:
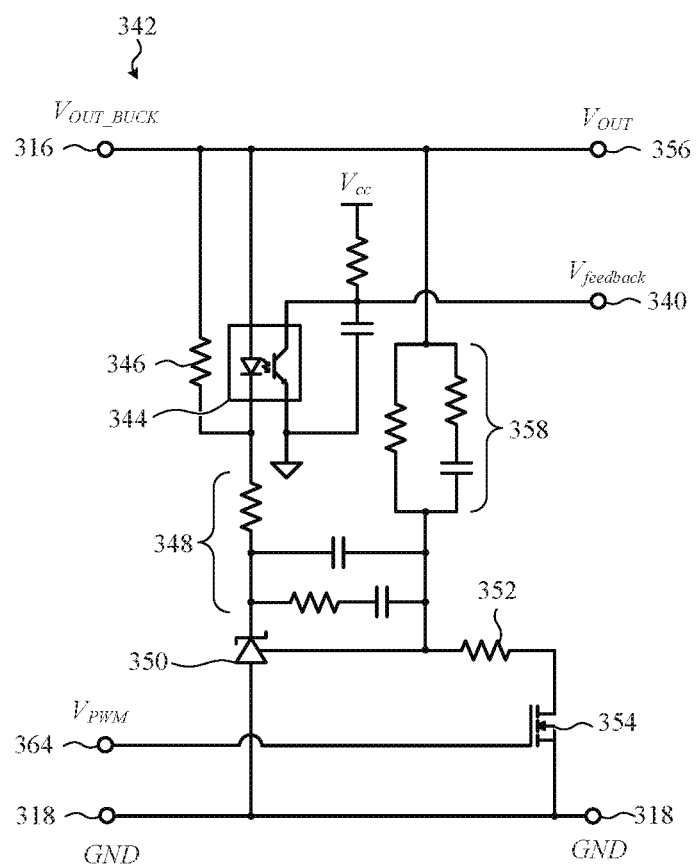
FIG. 3D is a simplified schematic diagram of a compensation network of the variable-output power converter described in reference to FIGS. 3A-3C.
Figure 4:
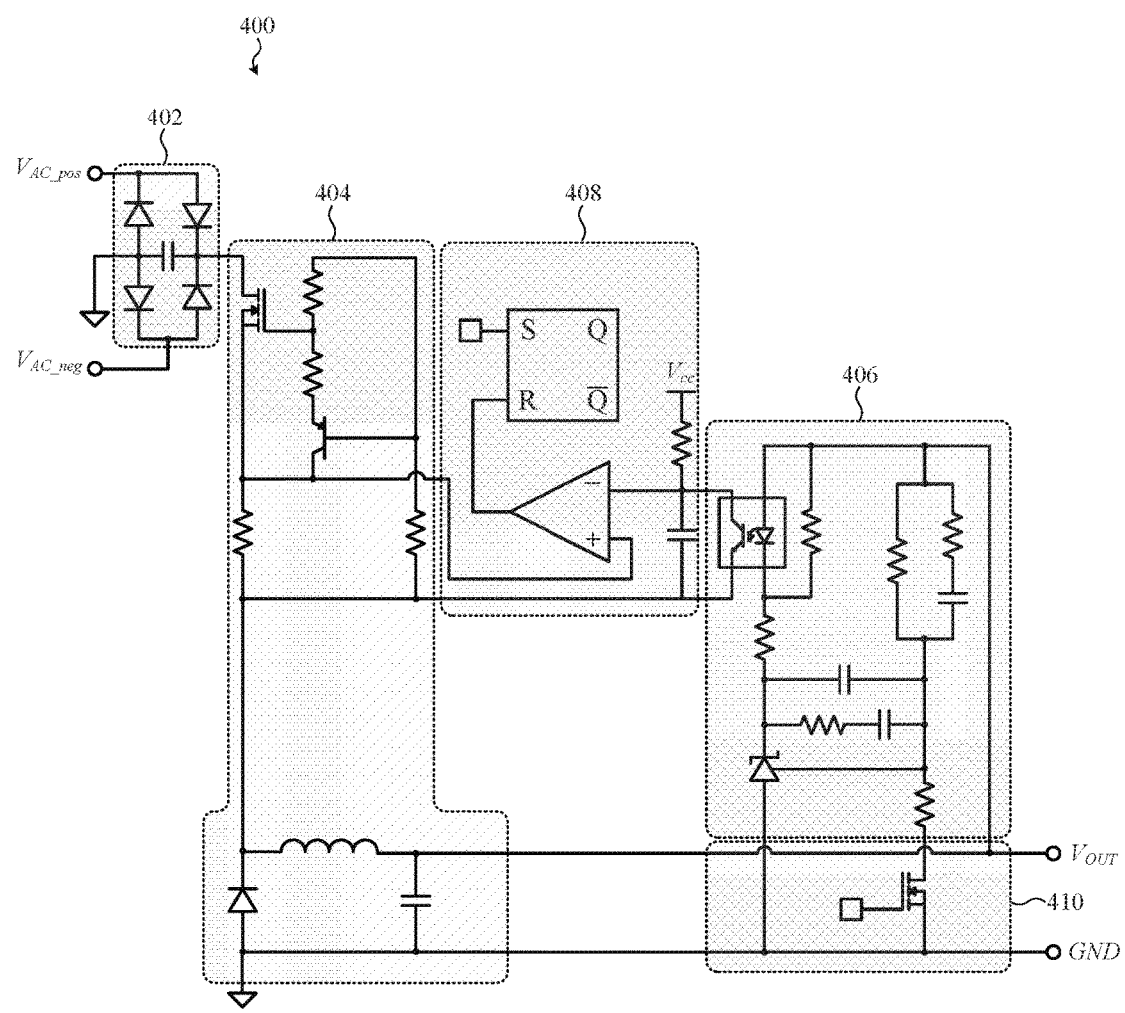
FIG. 4 is a simplified schematic diagram of a variable-output power converter operated with closed-loop control and configured to provide stable output voltage regulation.

Generally and broadly, FIGS. 3A-4 reference certain distinct and interconnected purpose-configured circuits that can be used to implement a variable-output power converter such as described herein. It will be appreciated, however, that the depicted examples are not exhaustive; the various embodiments and circuits depicted and described with reference to FIGS. 3A-4 may be implemented, interconnected, or otherwise modified in any number of suitable or appropriate ways.

For example, FIG. 3A depicts a simplified schematic diagram of an example rectifier of a variable-output power converter such as described herein. The rectifier 300 receives alternating current from an alternating current power source, (such as the alternating current power source 202 shown in FIG. 2) and rectifies the received current into rippled direct current. More particularly, the rectifier 300 can be coupled to two leads of an alternating current power source, identified as nodes $V_{AC\_pos}$ and $V_{AC\_neg}$ which are respectively associated with the rectifier input lead 302a and the rectifier input lead 302b.

The rectifier 300 can be a half-bridge rectifier, although in the illustrated embodiment, a full-bridge rectifier formed by the diode network 304 is used. In many cases, a filter capacitor 306 can be added in parallel to the output $V_{rect}$ of the rectifier 300 to further smooth the rippled direct current waveform. The filter capacitor 306 functions as a low-pass filter. Although the rectifier is illustrated as a passive full-wave rectifier, such a configuration may not be required of all embodiments. For example, the rectifier 300 can be a synchronous rectifier in which the diodes of the diode network 304 are substituted for switches such as MOSFETs. The output terminal of the rectifier 300, which is configured to output rippled direct current (e.g., rectified alternating current), is identified as the rectifier output terminal 308.

FIG. 3B depicts a simplified schematic diagram of a high-side output buck converter of a variable-output power converter such as described herein. As with other buck converters described herein, the high-side buck converter 310 includes an output capacitor 312 and a tank inductor 314.

In this topology, the low-side lead of the tank inductor 314 is coupled to a high-side lead of the output capacitor 312, which, in turn, is connected to output leads of the high-side buck converter 310. Specifically, the output leads of the high-side buck converter 310 include a positive output terminal 316 and a negative output terminal 318.

A catch diode 320 couples a high-side lead of the tank inductor 314 to a low-side lead of the output capacitor 312. The catch diode 320 defines a current path through the tank inductor 314 to the positive output terminal 316 when the high-side buck converter 310 is in an off-state. A switch 322 (e.g., a MOSFET) can be used to couple the low-side lead of the tank inductor 314 to a ground reference of the high-side buck converter 310.

The voltage level converter, implemented as a high-side buck converter 310, can be switched between an on-state and an off-state by toggling the switch 322. More specifically, when the high-side buck converter 310 is in the on-state, the switch 322 is closed and a first current loop is defined from the rectifier output terminal 308, through the tank inductor 314, to the positive output terminal 316.

In the on-state, voltage across the tank inductor 314 sharply increases to a voltage level equal to the difference between the voltage across the positive output terminal 316 $V_{OUT\_BUCK}$, and the input voltage $V_{rect}$. This voltage across the tank inductor 314 induces current $i_L$ through the tank inductor 314 to linearly increase. As a result of the topology of the circuit, the current $i_L$ flowing through the tank inductor 314 also flows to the output capacitor 312 and to the positive output terminal 316.

When the high-side buck converter 310 transitions to the off-state, the switch 322 is opened and a second current loop is defined through the catch diode 320. In this state, voltage across the tank inductor 314 sharply decreases to a voltage level equal to the difference between the voltage across the positive output terminal 316, $V_{OUT\_BUCK}$, and the cut-in voltage of the catch diode 320 (e.g., 0.7 VDC). In this manner, this voltage across the tank inductor 314 is lower than when in the on-state, so the current $i_L$ within the tank inductor 314 linearly decreases in magnitude. The decreasing current $i_L$ flowing through the tank inductor 314 also flows to the output capacitor 312 and to the positive output terminal 316. In this manner, the output capacitor 312 functions as a low-pass filter, generally reducing ripple in the voltage delivered from the output of the high-side buck converter 310 to the positive output terminal 316.

As noted with respect to some embodiments described herein, the high-side buck converter 310 can be efficiently operated by switching between the on-state and the off-state by toggling the gate voltage $V_{gate}$ of the switch 322 at a duty cycle selected based on the desired output voltage.

In one particular embodiment, the state of the switch 322 can be controlled with a gate drive circuit 324 configured to prevent the switch 322 from exhibiting a transient condition supporting both a high voltage and a high current, which may otherwise damage the switch and/or increase dynamic switching losses. More specifically, the gate drive circuit 324 provides a low impedance path for discharging the gate charge of the switch 322 required to toggle the conduction state of the switch 322.

In operation, increasing the voltage input 326, $V_{ctrl}$, to the gate drive circuit 324 causes the switch 322 to conduct current. Similarly, decreasing the voltage input 326 to the drive circuit 324 causes the switch 322 to stop conducting.

In some embodiments, a voltage measured from the source 328 of the switch 322 across a reference resistor 330 can be used to facilitate peak current control of the high-side buck converter 310. In other words, this voltage is used as an input to a comparator of a feedback controller discussed in reference to FIG. 3C, discussed below. As a result of this topology, two separate ground loops can be defined. A first ground loop (GND) defined in reference to the potential of the negative output terminal 318 and a second ground loop ($GND_{CTL}$) defined in reference to the low-side of the reference resistor 330.

The high-side buck converter 310 can be coupled to a peak current feedback controller 332, such as shown in FIG. 3C. The peak current feedback controller 332 can include a flip-flop 334 that is set by a clock signal 336 and reset via output from a comparator 338. The comparator 332 is typically a comparator.

The comparator 338, operating in reference to the second ground loop ($GND_{CTL}$), receives negative input by probing an output of a feedback/compensation network at a galvanically-isolated node 340 to determine a feedback voltage $V_{feedback}$ (see, e.g., FIG. 3D). The comparator 332 compares positive input by probing a voltage across the reference resistor 330 (see FIG. 3B) which corresponds to current through the switch 322 (see FIG. 3B) by Ohm's law. The comparator 338 amplifies the difference between the negative input $V_{feedback}$ and the positive input $V_{source}$ to produce an output that is connected to the reset lead of the flip-flop 334. The output of the flip-flop 334 is then applied as input ($V_{ctrl}$) to the gate drive circuit 324.

In normal operation, the clock signal 336 drives the on-state timing of the flip-flop 334. The off-state timing of the flip-flop 334 is controlled by monitoring current through the switch 322.

More specifically, when the switch 322 is in the on-state and is conducting current, the voltage across the reference resistor 330 ($V_{source}$) will be compared by the comparator 338 to voltage of the galvanically-isolated node 340. If current through the switch 322 increases, the voltage across the reference resistor 330 correspondingly increases. Once this voltage exceeds the voltage of the galvanically-isolated node 338 ($V_{feedback}$), the comparator 338 causes the flip-flop 334 to reset and the switch 322 to stop conducting current.

In this manner, controlling the voltage of the galvanically-isolated node 338 controls the peak current that can flow through the switch 322 and controls the duty cycle of the switch 322 which, in turn, controls the output voltage of the system.

The output of the high-side buck converter 310 can be coupled to a feedback/compensation network in order to smooth any ripple present in $V_{OUT\_BUCK}$ and to provide feedback to the comparator 338. FIG. 3D depicts a simplified schematic diagram of one such network that includes, among other components, a compensation network.

The feedback/compensation network 342 can be formed in any number of suitable ways to provide low-pass filtration of the voltage output from the high-side buck converter 310 and to provide a galvanically-isolated node suitable for providing feedback to the comparator 338.

More particularly, the feedback/compensation network 342 as shown in the illustrated embodiment includes two input terminals, two output feedback terminals, and the galvanically-isolated node 340 for providing feedback to the comparator 338. The two input terminals are the positive output terminal 316 and a negative output terminal 318 of the high-side buck converter 310. The two output feedback terminals are identified as the positive terminal 340 and the output ground reference terminal 342.

The feedback/compensation network 342 can include an opto-coupler 344 that can be used to isolate the galvanically-isolated node 340 and to isolate a ground loop associated with the high-side buck converter 310 from a ground loop associated with the output of the variable-output power converter.

A high side of the light-emitting portion of the opto-coupler 344 can be coupled to the input terminal of the feedback/compensation network 342, which has a potential equal to $V_{OUT\_BUCK}$. In this manner, changes in the value of $V_{OUT\_BUCK}$ (e.g., ripple), can result in changes in brightness of the opto-coupler 344, which in turn can change the voltage at the galvanically-isolated node 340 used by the comparator 338 to trigger the on-state of the switch 322 via the gate controller 324. In some cases, a discharge resistor 346 can be positioned parallel to the light-emitting portion of the opto-coupler 344 to provide a bias current to a shunt voltage regulator, described in detail below.

The feedback/compensation network 342 can also include a resistor-capacitor network 348 which can be suitably tuned and/or designed in order to provide useful feedback to the comparator 338 via the opto-coupler 344. In many cases, the resistor-capacitor network 348 is coupled to a shunt voltage regulator 350 that provides a voltage reference (at a voltage reference node) for comparison again the output voltage of the feedback/compensation network 342. The shunt voltage regulator 350 is coupled to a low-side lead of the light emitting portion of the opto-coupler 344.

More particularly, in operation, should the output voltage ($V_{OUT}$) drop (e.g., impedance change), the voltage across one or more resistors within the feedback/compensation network 342 can also drop. One such resistor is identified in the illustrated embodiment as the sense resistor 352, which is coupled to a reference voltage node output from the shunt voltage regulator 350. As a result of the illustrated topology, the detected voltage can be compared to the reference voltage provided by the shunt voltage regulator 350, which as noted above, is coupled to the low-side lead of the light emitting portion of the opto-coupler 344. As a result of this topology, when the output voltage drops, current through the opto-coupler 344 changes which, in turn changes the conduction properties of the transistor portion of the opto-coupler 344, which in turn change the voltage at the isolated node 340. As noted above, changes in the voltage of the isolated node 340 result in changes to the duty cycle of the switch 322.

The feedback/compensation network 342 can also include an output voltage sensing filter and/or a snubbing filter, such as the resistor and capacitor network 358. The resistor and capacitor network 358 can operate to suppress direct current ripple that may be present in the $V_{OUT\_BUCK}$ signal. The resistor and capacitor network 358 is typically coupled in parallel with the positive output load terminal 340 and the output ground reference terminal 342.

The feedback/compensation network 342 also includes a sense resistor toggle 354 (e.g., MOSFET) coupled in parallel to the sense resistor 352. The sense resistor toggle 354 can receive a pulse-width modulated signal that causes the sense resistor toggle 354 to rapidly turn on and off, rapidly introducing the sense resistor 352 to the feedback/compensation network 342 and disconnecting the sense resistor from the feedback/compensation network 342.

In this manner, by varying the pulse-width modulated signal, the output voltage level necessary to drop current through the opto-coupler 344 sufficiently to change in the voltage of the isolated node 340 is also changed. In other words, the on-time of the pulse-width modulated signal applied to the sense resistor toggle 354 directly controls the output voltage 356 and the peak current that can be delivered by the high-side buck converter 310. The frequency at which the pulse-width modulated signal received by the sense resistor toggle 354 can be selected to be out-of-band with respect to the operation of the feedback/compensation network 342; the feedback/compensation network 342 can filter out any noise introduced by the switching of the sense resistor toggle 354.

In this manner, the variable-output power converter described in FIGS. 3A-3D is operated in a peak current control mode, while maintaining stable output voltage $V_{out}$. In this embodiment, the output voltage is set by a pulse-width modulated signal. Adjusting the on-time of the signal adjusts a reference voltage that influences the operation of the output voltage control loop (e.g., the feedback/compensation network 342) and the current control loop (e.g., the peak current feedback controller 332).

FIG. 4 depicts a simplified schematic diagram of a variable-output power converter that may be implemented with the various schematics depicted and described in reference to FIGS. 3A-3D. In particular, the variable-output power converter 400 is configured to receive high-voltage AC and configured to output reduced-voltage DC.

Particularly, the variable-output power converter 400 includes a rectifier 402 that feeds into a high-side buck converter 404. The high-side buck converter 404 typically includes a gate controller to reduce switching losses.

The output of the high-side buck converter 404 can be smoothed and/or filtered by a feedback/compensation network 406. Feedback received from the feedback/compensation network 406 can be supplied to a feedback controller and a comparator 408. Finally, the variable-output power converter 400 can include a sense resistor toggle 410 that receives a pulse-width modulated signal and, in response, connects or disconnects a sense resistor within the feedback/compensation network 406 in order to control the output voltage level and the peak current level. In some embodiments, the sense resistor toggle 410 can be an integrated portion of the feedback/compensation network 406 (e.g., the feedback/compensation network 342 depicted in FIG. 3D)

The foregoing embodiments depicted in FIGS. 3A -4 and the various alternatives thereof and variations thereto are presented, generally, for purposes of explanation, and to facilitate a thorough understanding of various possible configurations circuits that may be used to implement a variable-output power converter such as described herein. However, it will be apparent to one skilled in the art that some of the specific details presented herein may not be required in order to practice a particular described embodiment, or an equivalent thereof.

Figure 5A:
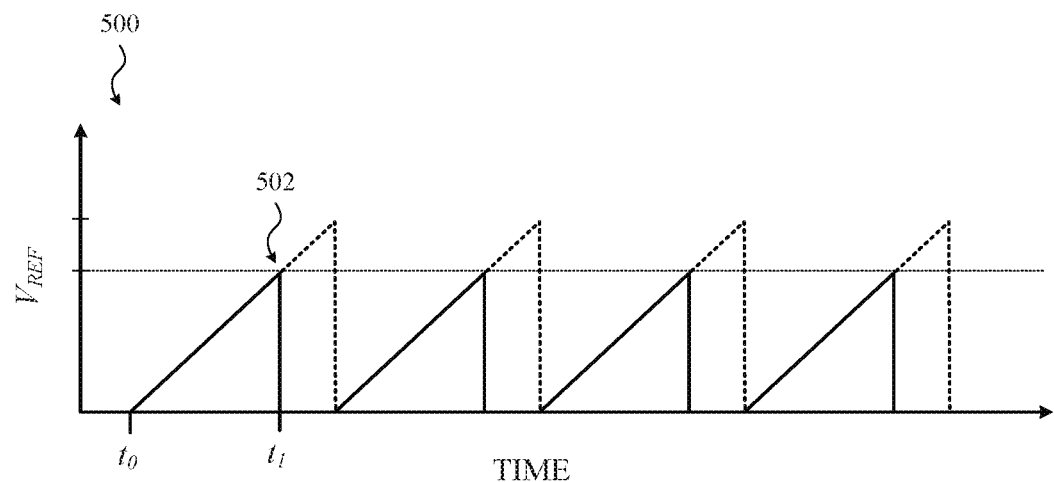
FIG. 5A is a simplified signal diagram tracking a source voltage level corresponding to current through a MOSFET associated with a variable-output power converter, such as described herein.
Figure 5B:
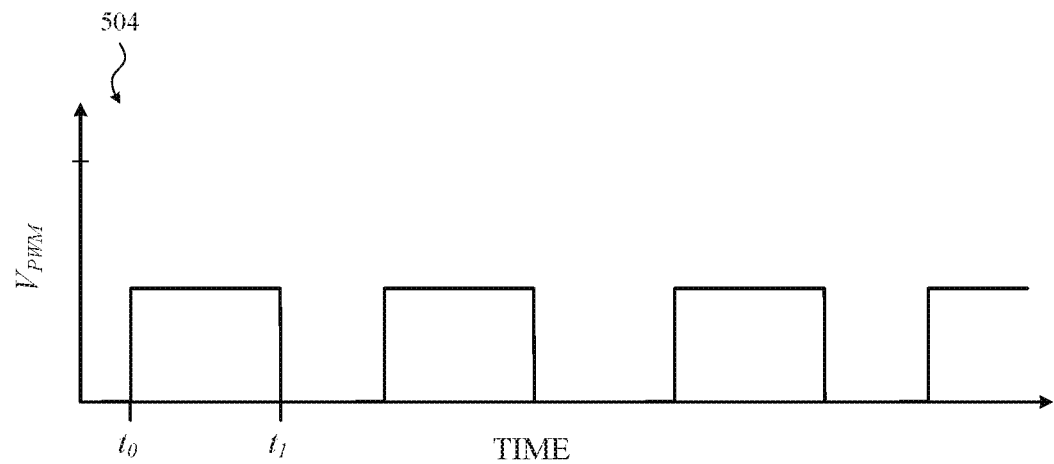
FIG. 5B is a simplified signal diagram tracking a pulse-width modulated signal that can be used to adjust of the voltage output from the variable-output power converter described in reference to FIG. 5A.

Generally and broadly, FIGS. 5A-5B are simplified signal diagrams corresponding to steady state operation of a variable-output power converter such as described herein.

For example, FIG. 5A depicts a simplified signal diagram tracking a source voltage level corresponding to current through a MOSFET associated with a variable-output power converter, such as described herein. In particular, the signal diagram 500 tracks a voltage across a sense resistor positioned in series with a MOSFET of a buck converter that is switched from an on-state to an off state. More specifically, the voltage across the sense resistor (and thus the current flowing through the MOSFET) is linearly increasing from time $t_0$ to time $t_1$, indicating that the MOSFET is conducting. At $t_1$, the current through the MOSFET crosses a threshold defined at the crossing 502. Once the threshold is crossed, the MOSFET may be turned off. In many cases, the MOSFET is turned off by a pulse-width modulated signal supplied to a sense resistor toggle (e.g., such as the sense resistor toggle 354 depicted in FIG. 3D), such as shown in the pulse-width modulated signal shown in FIG. 5B. More specifically, FIG. 5B depicts a simplified signal diagram tracking a pulse-width modulated signal 504 that can be used to adjust the peak current and the voltage output from the variable-output power converter described in reference to FIG. 5A.

Figure 6:
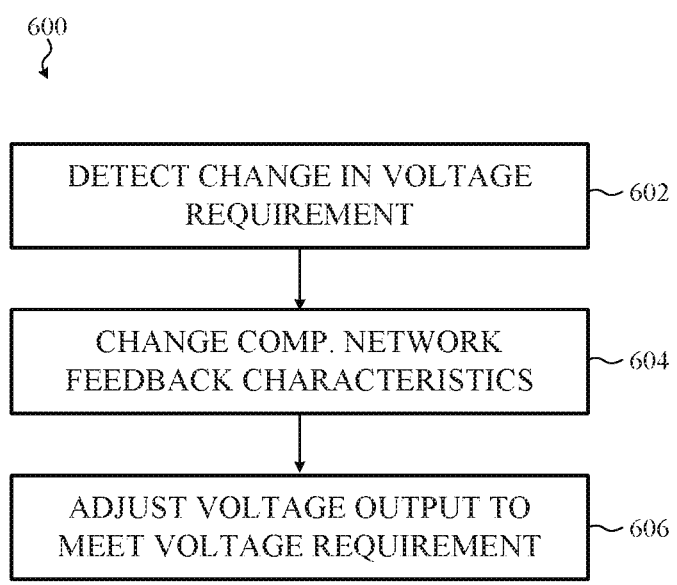
FIG. 6 is a simplified flow chart depicting example operations of a method of adjusting output voltage of a current-controlled buck converter.

FIG. 6 is a simplified flow chart depicting example operations of a method of adjusting output voltage of a current-controlled buck converter. The method depicted can, in some embodiments, be performed (at least in part) by one or more portions of a variable-output power converter such as depicted in FIGS. 3A-4. In other cases, the method is performed by another processor or circuit, or combination of processors or circuits.

The method 600 begins at operation 602 in which a change in an output voltage requirement is detected. In some examples, the change can be the result of a ripple in output voltage whereas in other embodiments, the change can be related to an average output voltage level (e.g., change from 3.3VDC to 5.0VDC).

Next, at operation 604 one or more characteristics of a compensation network parallel to the voltage output can be changed. In many examples described herein the compensation network is changed by selectively connecting or disconnecting sense resistors within the compensation network.

Lastly, at operation 606, the voltage output from the current-controlled buck converter is changed (e.g., as an effect of feedback resulting from the change at operation 604) to match the voltage requirement.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A variable-output power converter comprising:
a peak current controller;
a buck converter in communication with the peak current controller and comprising:
   a voltage-controlled switch; and
   a reference resistor connected to a source of the voltage-controlled switch and electrically coupled to the peak current controller;
a compensation network parallel to an output of the buck converter and comprising:
   a sense resistor parallel to an output of the compensation network; and
   a toggle coupled in series with the sense resistor and configured to control an electrical connection between the sense resistor and a circuit ground; wherein
the compensation network provides feedback to the peak current controller to adjust an on-time of the voltage-controlled switch; and
an on-time of the toggle corresponds to a voltage output from the compensation network.

2. The variable-output power converter of claim 1, wherein:
the toggle is configured to receive a pulse-width modulated signal; and
in response to the pulse-width modulated signal, the toggle is configured to connect or disconnect the sense resistor from the compensation network.

3. The variable-output power converter of claim 2, wherein:
the compensation network comprises a shunt voltage regulator comprising a reference voltage node; and
the sense resistor is connected parallel to the reference voltage node.

4. The variable-output power converter of claim 1, wherein the voltage-controlled switch is a MOSFET.

5. The variable-output power converter of claim 4, further comprising a gate controller coupled to a gate of the MOSFET.

6. The variable-output power converter of claim 5, wherein the peak current controller comprises:
a flip-flop comprising:
   a set lead configured to receive a clock signal; and
   an output coupled to an input of the gate controller; and
a comparator coupled to a reset lead of the flip-flop.

7. The variable-output power converter of claim 6, wherein the comparator comprises:
a positive input configured to receive a voltage drop across the reference resistor; and
a negative input configured to receive a feedback signal from an isolated node of compensation network.

8. The variable-output power converter of claim 1, wherein the buck converter further comprises:
a tank inductor coupled in series with the reference resistor;
an output capacitor coupled in parallel to the tank inductor; and
a catch diode connecting the output capacitor to the tank inductor.

9. The variable-output power converter of claim 8, wherein:
the tank inductor, the output capacitor, and the catch diode are associated with a first ground loop; and
the a compensation network is associated with a second ground loop.

10. The variable-output power converter of claim 1, wherein the toggle is a voltage-controlled switch.

11. The variable-output power converter of claim 1, wherein an input of the buck converter is coupled to mains voltage.

12. A power converter accommodated within a housing of an electronic device and comprising:
a voltage reducer configured to reduce an input voltage relative to a first ground reference and comprising a reference resistor;
a comparator comprising an input corresponding to a voltage across the reference resistor relative to a second ground reference;
a flip-flop comprising a reset lead configured to receive a first output voltage from the comparator; and a gate controller coupled to a gate of a MOSFET associated with the voltage reducer, the gate controller configured to receive a second output voltage from the flip-flop; wherein when current through the MOSFET increases beyond a threshold, the comparator causes the flip-flop to terminate the second output.

13. The power converter of claim 12, wherein the voltage reducer is configured to receive rippled direct current output from a rectifier.

14. The power converter of claim 12, wherein the voltage reducer is a high-side buck converter operating with peak power control.

15. The power converter of claim 12, wherein:
the housing is a low-profile housing; and
the voltage reducer is electrically coupled to an input of a wireless power transfer system accommodated in the low-profile housing.

16. The power converter of claim 12, wherein the voltage reducer is coupled directly to mains voltage.

* * * * *